United States Patent
Meier

(10) Patent No.: US 7,609,387 B2
(45) Date of Patent: Oct. 27, 2009

(54) METHOD AND MEASURING DEVICE FOR MEASURING AN ABSOLUTE DISTANCE

(75) Inventor: Dietrich Meier, Niedererlinsbach (CH)

(73) Assignee: Leica Geosystems AG, Heerbrugg (CH)

( * ) Notice: Subject to any disclaimer, the term of this patent is extended or adjusted under 35 U.S.C. 154(b) by 311 days.

(21) Appl. No.: 11/577,159

(22) PCT Filed: Sep. 29, 2005

(86) PCT No.: PCT/CH2005/000560

§ 371 (c)(1),
(2), (4) Date: Jun. 12, 2007

(87) PCT Pub. No.: WO2006/039820

PCT Pub. Date: Apr. 20, 2006

(65) Prior Publication Data

US 2009/0033945 A1 Feb. 5, 2009

(30) Foreign Application Priority Data

Oct. 13, 2004 (EP) .................................. 04405638

(51) Int. Cl.
*G01B 11/02* (2006.01)
*G01C 3/08* (2006.01)

(52) U.S. Cl. ........................................ 356/498; 356/4.1

(58) Field of Classification Search ................ 356/4.09, 356/4.1, 486, 496, 498
See application file for complete search history.

(56) References Cited

U.S. PATENT DOCUMENTS 4,606,638 A * 8/1986 Sommargren ................ 356/492
(Continued)

FOREIGN PATENT DOCUMENTS

DE 19542490 6/1997
(Continued)

OTHER PUBLICATIONS

Yokoyama, Shuko, et al.; "Real-time and high-resolution absolute-distance measurement using a two-wavelength superheterodyne interferometer"; Measurement Science & Technology; IOP Publishing UK; vol. 10, No. 12, Dec. 1999; pp. 1233-1239; XP-002357464.

*Primary Examiner*—Michael A Lyons
(74) *Attorney, Agent, or Firm*—Rankin, Hill & Clark LLP

(57) ABSTRACT

In a method and a measuring device (10) for measuring an absolute distance value corresponding with a range (9) between a measuring device (10) and a target (8), wherein for measuring the absolute distance value a number of individual measuring steps are performed with an absolute distance meter (1), a distance variation between the measuring device (10) and the target (8) is also measured with a relative distance meter (2) at least approximately simultaneously with these individual measuring steps and the distance variation is taken into account as the absolute distance is being determined. Preferably an iterative method comprising several sampling steps is used for measuring the absolute distance, e.g. according to the Fizeau method, wherein an output value (A) is generated from an input value ($f_n$, $f_{n+1}$, $f_{n+2}$, ...) and measured in each sampling step. The output value (A) is dependent on the input value ($f_n$, $f_{n+1}$, $f_{n+2}$, ...) and on the distance.

9 Claims, 1 Drawing Sheet

U.S. PATENT DOCUMENTS

| | | | | |
|---|---|---|---|---|
| 4,714,339 A | * | 12/1987 | Lau et al. | 356/4.09 |
| 5,521,704 A | * | 5/1996 | Thiel et al. | 356/486 |
| 5,764,360 A | * | 6/1998 | Meier | 356/486 |
| 7,285,793 B2 | * | 10/2007 | Husted | 250/577 |

FOREIGN PATENT DOCUMENTS

| | | |
|---|---|---|
| EP | 1172637 | 1/2002 |
| WO | 00/63645 | 10/2000 |
| WO | 02/084327 | 10/2002 |

* cited by examiner

METHOD AND MEASURING DEVICE FOR MEASURING AN ABSOLUTE DISTANCE

BACKGROUND OF THE INVENTION

1. Field of the Invention

The invention lies in the field of the electro-optical measuring of distance. It relates to a method and a measuring device for measuring an absolute distance according to the generic term of the corresponding independent claims.

2. Description of Related Art

High-resolution distance measurements are taken by using instruments for the determination of a relative distance, e.g. laser interferometer, wherein a collimated laser beam travels from a measuring device to a reflecting target. The projected beam is superimposed upon the reflected beam received in the measuring device. As the distance changes, the intensity of the superimposed beams changes according to the interference of the two rays. Such variations of intensity are detected and registered by means of a counter. The distance variation is determined according to the number of intensity changes and the frequency of the laser light. Based upon a predetermined reference value, i.e. an absolute distance in a starting position, an absolute distance of other positions can, thus, also be determined. In order to measure the distance to a moving reflector or target, measuring devices are designed as trackers, i.e. the laser beam automatically follows the target by means of a rotating mirror. Elevation and azimuth of the laser beam are measured, enabling the determination of the target position in three dimensions. Based on this simple measuring principle, the position can be registered even at a target speed of, for example, up to 10 m/s.

The condition for such a method of determining a relative distance is that the beam between the measuring device and the target is not interrupted. If this does happen, the distance variations are no longer registered and the absolute distance between measuring device and target cannot be known. This absolute distance must therefore be determined or calibrated anew by other means. Such a combination of an absolute distance meter and an interferometer is revealed in the publication DE 195 42 490 C1.

Various methods of measuring an absolute distance are known, e.g. different variations of the Fizeau method, as also described and quoted in the DE 195 42 490 C1 mentioned above. To be suitable as a base value for an interferometer method, such a distance must be of similar accuracy, i.e. e.g. in the range of micrometers at a measuring distance of up to 100 meters.

Contrary to measuring a relative distance however, measuring an absolute distance at such a distance and accuracy requires a certain minimal length of measuring time during which the distance must not change. Therefore the target cannot be held manually by an operator but has to be placed on a steady support for calibration, which entails a time-consuming interruption in the measuring procedure.

WO 02/084327 A2 describes the method of measuring an absolute distance by means of laser light, wherein the ray is guided alternately along a measuring light path and a reference light path. The measuring light path extends along the distance to be measured and the reference light path lies within the measuring device. Thus, a distance variation of an internal reference light path is determined to compensate drift and temperature related changes.

An indirect determination of position by means of a tracker is described in WO 00/63645, wherein a position of a reference point of a measuring device is to be determined. The reference point is not visible from the tracker. A retro-reflector on the measuring device is moved along a known track, followed by the tracker. The position and orientation of the reference point can be determined from the measured positions of the retro-reflector and from the known geometry of the measuring device.

BRIEF SUMMARY OF THE INVENTION

It is, thus, the object of the invention to create a method and a measuring device for measuring an absolute distance of the aforementioned kind, which permit a precise determination of an absolute distance even while the target moves.

This object is achieved by a method and a measuring device for measuring an absolute distance with the characteristics of the corresponding independent claims.

A distance-measuring device includes means to determine an absolute distance and means to determine a relative distance between the measuring device and a target detects distance variations arising during a determination of the absolute distance by the means to determine the relative distance and takes these variations into account in the determination of the absolute distance.

Thus, distance variations occurring during the time taken for measuring the absolute distance, in particular movements of the target can be compensated. It is no longer necessary for the target to remain static. The target may indeed be held in the hand of an operator without necessitating substantial interruptions in a measuring sequence.

In a preferred embodiment of the invention, the means to determine the absolute distance is designed to carry out an iterative method. In other words, the method advances towards the correct absolute distance measurement through a series of sampling steps. In each step an output value is determined from an input value, which output value depends on the input value and the distance. Any distance variation arising from a movement of the target and/or the measuring device between one sampling step and the next is detected by the means to determine the relative distance and is used to compensate the distance variation during the determination of the input value for the following sampling step.

Thus, the iterative method can converge unperturbed by distance variations. Two different measuring methods are applied to the same measuring distance and combined, their advantages complementing one another: "slow" determination of the absolute value and "fast" determination of the relative value.

In a preferred embodiment of the invention the method of measuring the absolute distance is a Fizeau method. The input value is a modulation frequency acting upon a departing and a returning light beam and the output value is an intensity of the returning light beam after its modulation.

In another preferred embodiment of the invention, the means to determine the absolute distance is equipped to determine a plurality of measured values. In order to eliminate noise, these measured values are filtered, for example by integration or by averaging. For the compensation of distance variations between the individual measurements each distance variation is detected by the means to determine the relative distance while the synchronous values of the distance variation are subtracted from the measured values prior to filtering.

In further preferred embodiments of the invention, the measurement of the distance variation is used to correct measurements of the absolute value by means of:

a phase measuring method with modulated light, a "chirped" signal, coherent or incoherent, or an interferometer of absolute values.

Here too, the principle applies that calculated values relating to an absolute distance are corrected by the measured values of a simultaneous relative distance or respective distance variations.

The measuring device for measuring an absolute distance includes a means to determine an absolute distance corresponding with the range between the measuring device and a target, and means to determine a relative distance along and in the direction of this range. Therein the means to determine an absolute distance is designed to perform several individual measuring steps and the measuring device comprises means to take into account the distance variations when determining the absolute distance.

In a first preferred embodiment, the measuring device includes means to execute an iterative method of several sampling steps, wherein an output value dependent on the input value and on the distance can be measured in each sampling step from an input value. The means to determine the relative distance is designed to determine a distance variation arising between one sampling step and the next. The measuring device further comprises means to compensate the distance variation while determining the input value for the following sampling step.

In a second preferred embodiment, the measuring device includes means to measure a sequence of absolute distance values, means to measure a sequence of at least approximately simultaneous relative distance values, and means to correct each absolute distance value by the corresponding approximately simultaneous relative distance value. This means to correct forms a sequence of corrected absolute distance values, from which values a means to evaluate determines a representative absolute distance. This representative absolute distance is e.g. a weighted average or a value arrived at by other means of filtering.

The aforementioned means to compensate or means to evaluate can be designed as part of the means to determine the absolute distance, or they may be designed as part of a processing unit, which combines data from both, absolute and relative distance measurements. In the first case, the measuring device comprises means to communicate relative distance values to the means to determine the absolute distance. The relative distance values relate to any predetermined start value according to any predetermined reference position.

In another preferred embodiment of the invention, the measuring device comprises means to focus the measuring beam upon the target, as described e.g. in EP 0 313 518 A2. This makes it possible to carry out absolute as well as relative distance measurements with a non-cooperative target. A non-cooperative target is an object not particularly prepared or an object equipped with simple means only, such as e.g. a reflecting foil.

BRIEF DESCRIPTION OF THE DRAWINGS

In the following the object of the invention is explained in more detail in connection with preferred examples of embodiments illustrated in the enclosed figures showing.

The reference numbers used in the figures and their meaning are summarized in an index of reference numbers. In principle, same reference numbers indicate the same components in all the figures.

DETAILED DESCRIPTION OF THE INVENTION

Figure 1:
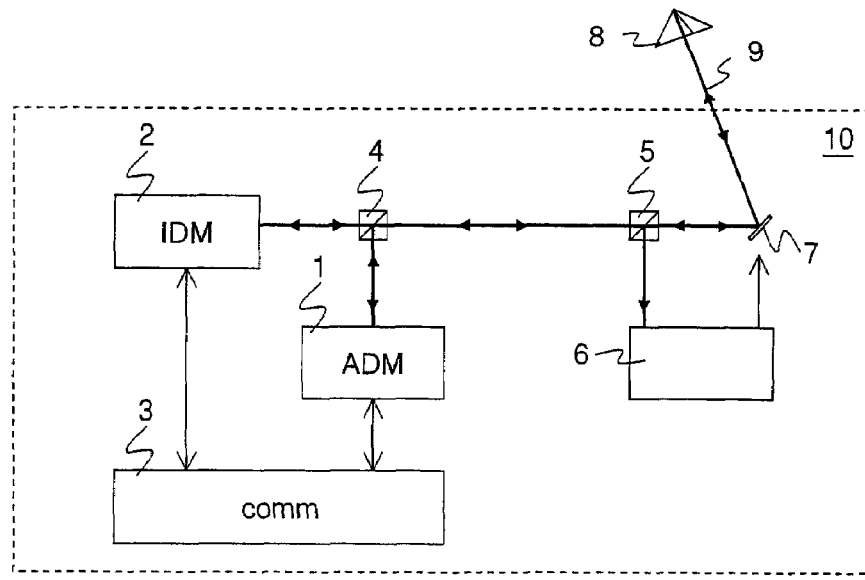
FIG. 1 schematically a structure of a distance-measuring device according to the invention.

FIG. 1 shows the diagram of a structure of a distance-measuring device according to the invention, with a combined absolute distance measurement according to a preferred embodiment of the invention. Light rays projected from an absolute distance meter 1 and from a relative distance meter 2, are combined by a first beam splitter 4 and returning light is divided between these two distance meters 1, 2, respectively. The first beam splitter 4 is, for example, a dichroic beam splitter. A control unit 3 is installed for the exchange of data and control signals with both, the absolute distance meter 1 and the relative distance meter 2. The control unit 3 transmits data from the relative distance meter 2 to the absolute distance meter 1, and/or combines data or measured distance values generated by these two meters 1, 2. From the first beam splitter 4 the rays reach a tracking mirror revolving around two axes 7 via a second beam splitter 5. A tracking regulator 6 detects a section of the returning light by means of a position-sensitive diode (PSD) and adjusts the position of the tracking mirror 7 according to the light displacement, so that the light beam follows a reflecting target or reflector 8. The reflector 8 comprises e.g. a triangular prism or a reflecting foil. The measuring distance 9 extends along the projected and the reflected light beams respectively between a predetermined reference-zero in the measuring device 10 and the reflector 8.

The measuring device 10 also comprises other electrical and optical means known from the state-of-the-art technology, e.g. to deflect and collimate the rays. For the sake of simplicity these are not shown in the figure. In a preferred embodiment of the invention the measuring device 10, or parts thereof are integrated in the support of a motorised theodolite or in a measuring column. In the case of a theodolite there is no tracking mirror 7.

The relative distance meter 2 is preferably an interferometer. In order to determine the relative position by interferometer it comprises an up-down-counter registering the transient value of the reflector's displacement. Every time the target moves by half a light wavelength in a measuring direction, a meter pulse is added or subtracted, depending on the direction of the displacement. In the case of e.g. an HeNe-laser this takes place every 0.32 micrometers. The count can be selected and stored any time. Due to two different counts, a relative motion dL between the relevant selections can be determined as $$dL = dM \cdot lambda \cdot \frac{n}{2}$$

wherein
dM=difference between the counter values,
lambda=wavelength of the light applied,
n=phase refraction index of the medium, usually air.

Subsequently, e.g. across a measuring distance of 0.1 to 50 m and for a target speed of up to and beyond 10 m/s, a resolution of 0.3 to 2.4 micrometers with an accuracy of ca. ±0.3 ppm is possible.

The absolute distance meter 1 is preferably a distance meter according to the Fizeau principle. The measuring light beam is modulated twice by the same modulator; once as an emitting ray at the point of entering the range to be measured, and again as a returning beam or receiving ray at the point of exit. During modulation e.g. a polarisation and/or the intensity and/or the frequency of the light is modulated.

Figure 2:
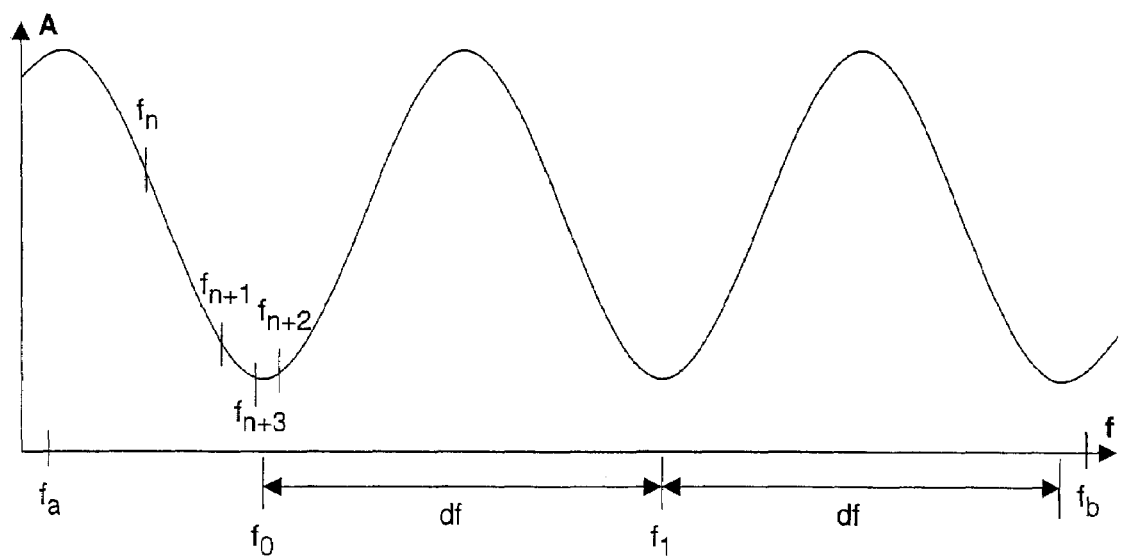
FIG. 2 various variables as may occur in a Fizeau method.

As a result, the illumination changes periodically after the second modulation or reverse modulation as a function of the reflector distance and the modulation frequency: e.g. during linear changes of the modulation frequency and at a fixed distance, points of low and points of high illumination A are generated alternately at the exit of the demodulation, as illustrated in FIG. 2. This illumination A is measured by a photodiode. The points of minimal illumination are evenly spread across the frequency, at a frequency spacing of df=c/2D, wherein c is the velocity of light and D the distance to be measured. At least two of those minimal points at $f_1$ and $f_0$ are detected by varying the frequency f. From this, the distance is determined by means of the following formula:

$$D = \text{Round}\left(\frac{f_0}{|f_0 - f_1|}\right) \cdot \frac{c_0}{2 f_0 n_g} + \text{Add}$$

wherein the function Round( ) rounds up to a whole number, and the following applies:
 D=absolute distance
 $f_0$, $f_1$=frequencies of minima
 ng=group refraction index
 $c_0$=velocity of light in the vacuum
 Add=additive constant For the exact determination of the minima, the light modulation frequency f is preferably also frequency-modulated: For example, a sinusoidal frequency modulation (FM) of 20 kHz with a range of ca. 500 kHz is performed on a base frequency f in a band between 2 and 2.3 GHz. From this, the first derivative is created from the signal detected from the photodiode, and at the minimal point of the signal without FM-modulation a zero crossing of the FM-modulated signal takes place. Such a zero crossing is easier to detect than a minimum. The determination of the amplitude of the incoming signal at a predetermined basic frequency—with or without the additional FM-modulation—is hereafter referred to as sampling.

As mentioned above, at least two minima, i.e. two adjoining zero passages of the demodulated signal, are required for the determination of the absolute distance with the relevant frequencies $f_0$ and $f_1$. These zero points are determined iteratively by variations of the basic frequency. The frequency step is adjusted at each iteration step in order to lead to the desired zero passage as rapidly as possible, and the last steps are determined according to the maximum desired resolution, e.g. 1 ppm. This results in a time optimal sampling sequence of frequency steps leading to the zero passage or minimum frequency $f_0$, $f_1$, . . . .

Thus a resolution of approximately 1 micrometer with an accuracy of less than ±25 micrometers is possible for stationary targets e.g. across a measuring distance of 1 to 100 m. The measuring time for a first determination of distance takes e.g. 200 milliseconds. By subsequent repetitive measuring at a zero point, approximately ten values can be determined per second. Various installations and methods for such a distance measurement are described in the aforementioned DE 195 42 490 C1. The absolute distance meter is either integrated in the beam path of the interferometer, so that both measuring methods work with light from the same source, or the two systems work with separate light wavelengths, as shown in FIG. 1. E.g. the interferometer uses a HeNe-Laser and the absolute distance meter a 780 nm laser diode.

The frequency steps decrease in length as they approach the zero crossing, which corresponds with increasingly shorter steps of the distance to be measured. As this iterative approach requires a certain amount of time, the state-of-the-art technology insists that the distance does not change during this period, as the iteration would otherwise continue in the wrong place and the iteration of the distance variation usually could not follow fast enough.

The same problem also arises before and after the described iteration: Previously, e.g. a rough measurement of the distance can be taken by sampling several input values within a predetermined bandwidth, as described below. After a first determination of the minimum, this is preferably repeated several times in order to determine an average as the zero passage frequency $f_0$, $f_1$ from the results. In total e.g. 20 scans are needed for the rough measuring, approximately 20 scans for the iteration and 10 scans for the repeated determination of the minimum, which at 1 ms per scan, implies a duration of 50 ms.

A determination of the relative distance variation, e.g. by means of an interferometer method, is therefore carried out simultaneously with the individual scans, particularly during the iteration. A new iteration step is corrected between the last and the new scan according to the relative motion of the target thus measured.

In a new measuring procedure, a rough measurement of the distance is therefore taken for the determination of the absolute distance at the beginning of the measuring. To this end the zero spacing becomes $f_0$-$f_1$ and the rough distance is determined from $$D_0 = \frac{c_0}{2 \cdot |f_0 - f_1| \cdot n_g}$$

During the subsequent iteration each step, correction is calibrated by this value. The rough measuring can be a scan across the modulation bandwidth of the modulator, i.e. the determination of a multiple of scanned values within the modulation bandwidth. At a basic frequency of $f_a$=2 GHz to $f_b$=2.25 GHz the modulation bandwidth is e.g. 250 MHz. During this scan the distance drift of the reflector should not exceed approx. c/(4*f)=35 mm (c=velocity of light), which is normally achieved with a hand-held mirror during a total measuring time of e.g. approximately 200 ms.

The correction value for the frequency Δf is calculated from the relative motion Δs to $$\Delta f = -\frac{f_0}{D_0} \cdot \Delta s.$$

For example, $f_0$=2 GHz, $D_0$=10 m and Δs=5 mm produce a correction value of Δf=1 MHz.

The compensation of the relative drift also takes place during the preliminary rough measuring and during the subsequent repetitive determination of the minimum. The determination of the minimum is performed for at least two different frequencies $f_0$ and $f_1$. Once these values are available, the subsequent calculation of the relevant distance D also requires a certain calculation time, therefore the relative position continues to be monitored while this calculation takes place. Once the distance is known, it is corrected by the simultaneously up-dated distance variation and henceforth used as a reference value for the relative distance meter 2. E.g. the counter in the relative distance meter 2 is set according to the reference value, or a constant offset according to the reference value is added to the distance.

To summarize, it may be said that for the scans for the different measurements preferably throughout the entire measuring procedure, each calculated value, which is the equivalent of the absolute distance, is corrected by measured values from simultaneous associated relative distances.

In spite of a moving reflector, the method will therefore in principle converge just as well and rapidly as without movement.

Following the measuring procedure for the determination of the absolute distance said value is transferred to the relative distance determination, i.e. e.g. to the interferometer. Then the distance value follows even rapid movements, e.g. of more than 5 m/s, via the value measured by the interferometer.

In a further preferred embodiment of the invention, the absolute distance meter according to the Fizeau principle uses two light wavelengths. In addition to the aforementioned 780 nm laser diodes, e.g. another laser diode with a wavelength of e.g. below 450 nm ("blue") is used, whose light is coupled into the measuring ray. Thus, two measurements of a distance are carried out with different wavelengths, which facilitates a compensation or elimination of the refraction index of the air.

Figure 3:
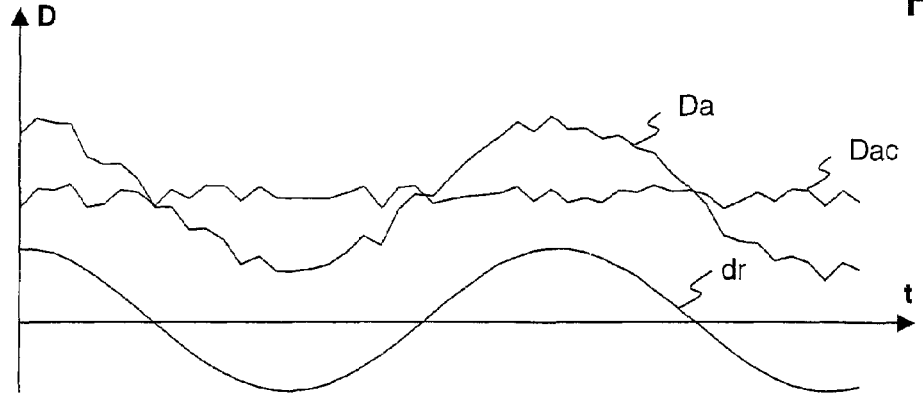
FIG. 3 variables as may occur in a filtering method.

In another preferred embodiment of the invention the interval between transmission and echo-return is timed in order to determine the absolute distance. To summarize the values of several such timings for the compensation of measuring inaccuracies, e.g. by averaging, said values are corrected according to the values of the relative drift. FIG. 3 shows an exemplary sequence of measuring values Da from an absolute distance determination, a sequence of a simultaneously detected relative position dr, and a corrected sequence of absolute distances Dac resulting from the difference Da−dr. Values of each relative position corresponding at least approximately with the position of the target at the moment of the measuring light's reflection are used as correction values dr.

The method can be similarly applied to the elimination of noise in a series of absolute values by averaging or integration.

In further preferred embodiments of the invention the measuring of the distance variation for correction while measuring an absolute value is executed by means of:

a phase measuring method with modulated light,
a "chirped" signal, coherent or incoherent, or
an interferometer of absolute values.

In all these cases the distance variation during integration time is detected and compensated in the measuring procedure.

| Index of reference numbers | |
|---|---|
| 1 | absolute distance meter |
| 2 | relative distance meter |
| 3 | control unit |
| 4 | first beam splitter |
| 5 | second beam splitter |
| 6 | tracking regulator |
| 7 | tracking mirror |
| 8 | reflector |
| 9 | range |
| 10 | measuring device |

The invention claimed is:

1. A method for measuring an absolute distance corresponding with a range (9) between a measuring device (10) and a target (8), comprising:

executing several individual measuring steps by means of an absolute distance meter (1) for measuring the absolute distance, wherein at least approximately simultaneously with said individual measuring steps the method executes the following steps:

a relative distance meter (2) measuring a distance variation between the measuring device (10) and the target (8) as a transient value of a target displacement the absolute distance meter (1) taking said distance variation into account when determining the absolute distance; the absolute distance meter (1) computing at the absolute distance value iteratively through several sampling steps, the relative distance meter (2) detecting distance variations between the measuring device (10) and the target (8) arising between two sampling steps; and incorporating said distance variations in the control of the absolute distance meter (1) in the later of the two sampling steps.

2. The method according to claim 1, further comprising applying an iterative method with several sampling steps for measuring the absolute distance value, comprising the steps of, in each sampling step generating and measuring, from an input value ($f_n$, $f_{n+1}$, $f_{n+2}$, ... ), the input value being a modulation frequency acting upon a departing and a returning ray, an output value (A), the output value (A) being an intensity (A) of the modulated returning ray and dependent on the input value ($f_n$, $f_{n+1}$, $f_{n+2}$, ... ) and on the distance, measuring each distance variation occurring between one sampling step and the next and using said distance variation for compensating the distance variation when determining the input value ($f_{n+1}$, $f_{n+2}$, $f_{n+3}$, ... ) for the following sampling step.

3. The method according to claim 2, comprising the step of correcting the frequency $f_{n theor}$ that was theoretically determined according to the iterative method, in order to determine a frequency $f_n$ to be actually used, according to a measured distance variation $\Delta s$ in the following manner $$f_n = f_{n theor} + \Delta f$$

wherein $$\Delta f = -\frac{f_0}{D_0} \cdot \Delta s$$

and $f_0$ is the measuring frequency or basic modulation frequency and $D_0$ is a rough distance, i.e. a preliminary estimate of the distance to be measured.

4. The method according to claim 1, comprising the following steps:

measuring a sequence of absolute distance values, measuring a sequence of at least approximately simultaneous relative distance values, correcting each one of the absolute distance values by the corresponding, at least approximately simultaneous relative distance value in order to form a sequence of corrected absolute distance values, and evaluating the sequence of corrected absolute distance values in order to determine a representative absolute distance.

5. The method according to claim 4, wherein the evaluation step involves averaging, integration or another kind of filtering.

6. A measuring device (10) for measuring an absolute distance, comprising:
- an absolute distance meter (1) for the determination of an absolute distance corresponding to a range (9) between the measuring device (10) and a target (8),
- a relative distance meter (2) for the determination of a distance variation between the measuring device (10) and a target (8) as a transient value of the target's displacement, that the absolute distance meter (1) is designed to generate the absolute distance value iteratively across a number of individual measuring steps, and
- means to take into account the distance variations between the measuring device (10) and the target (8), arising between two sampling steps and detected by the relative distance meter (2), during the determination of the absolute distance by the absolute distance meter (1) in the later of the two sampling steps.

7. The measuring device (10) according to claim 6, wherein the measuring device comprises means (1) to execute an iterative Fizeau method of a number of sampling steps, wherein during each sampling step an output value (A), being an intensity (A) of the modulated returning ray that is dependent on the input value and on the distance, can be measured from an input value, being a modulation frequency acting upon a departing and a returning ray, and wherein the means (2) to determine the relative distance is designed to determine a distance variation occurring between one sampling step and the next, and the measuring device (10) comprises means to compensate the distance variation during the determination of the input value for the following sampling step.

8. The measuring device (10) according to claim 6, wherein the measuring device comprises means (1) to measure a sequence of absolute distance values, means (2) to measure a sequence of at least approximately simultaneous relative distance values, means to correct each absolute distance value by the corresponding, at least approximately simultaneous relative distance value in order to form a sequence of corrected absolute distance values, and means to evaluate the sequence of corrected absolute distance values in order to determine a representative absolute distance.

9. The measuring device (10) according to claim 6, wherein the measuring device comprises means to transmit relative distance values to the means (1) to determine the absolute distance.

* * * * *